United States Patent [19]
Tanner et al.

[11] 3,806,270
[45] Apr. 23, 1974

[54] DRILL FOR DRILLING DEEP HOLES
[76] Inventors: William Tanner, 128 Leicester Rd., Glen Parva, Leicestershire; Colin Perrett, 31 Wellhouse Close, Wigston Magna, Leicestershire, both of England
[22] Filed: Mar. 20, 1972
[21] Appl. No.: 236,360

[30] Foreign Application Priority Data
Mar. 22, 1971 Great Britain .................... 7460/71

[52] U.S. Cl. .................. 408/56, 408/226, 408/230, 408/705
[51] Int. Cl. ..................... B23b 51/02, B23b 51/06
[58] Field of Search ............ 408/56, 226, 705, 229, 408/230; 175/394, 323, 410

[56] References Cited
UNITED STATES PATENTS
2,898,786   8/1959   Willingham .................... 408/226 X

*Primary Examiner*—Gil Weidenfeld
*Attorney, Agent, or Firm*—Kirschstein, Kirschstein, Ottinger & Frank

[57] ABSTRACT

A drill for drilling holes which are long in relation to their diameter, for example in graphite blocks for use in a nuclear reactor, comprises a tubular drill stem and, secured in and projecting from one end thereof, a drill tip in the form of a fluted twist drill, the drill tip comprising a tail part within the stem, a body part which projects from the stem, and, at that end of the body part which is remote from the stem, a head part which is of greater diameter than the body part and than the stem, the drill tip having flutes which extend continuously along its head, body and tail parts and through which the stem is open at its said one end.

In use, the drill is mounted in a collet and rotated thereby, while air or other fluid is fed through the stem to the drill tip whence it escapes, carrying swarf, through the annular space surrounding the stem in the hole being drilled.

8 Claims, 4 Drawing Figures

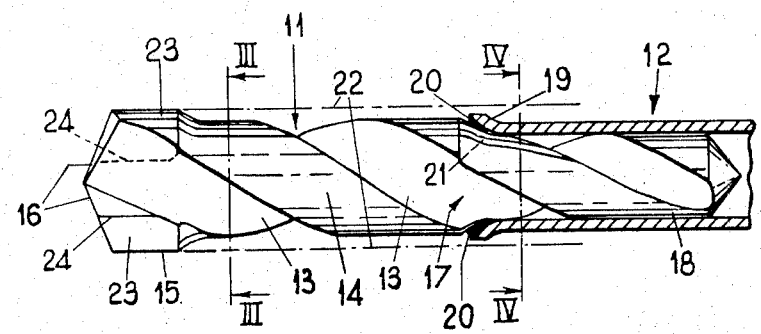
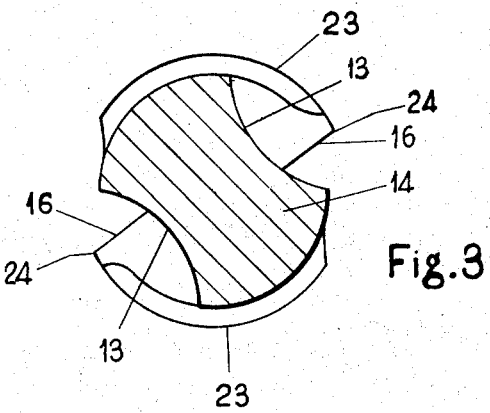
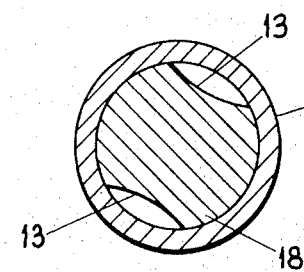
Fig. 1
Fig. 2
Fig. 3
Fig. 4

DRILL FOR DRILLING DEEP HOLES

This invention relates to drills, and more particularly to drills for drilling holes which are long in relation to their diameters.

In the machining of graphite blocks which are to be stacked together to form the moderator core of a nuclear reactor, it is often desired to drill relatively narrow holes from end to end of a block, for example so that corresponding holes in a number of blocks stacked upon one another in a column may form a narrow channel which can be supplied with methane to inhibit oxidation of the graphite of which the blocks are formed. Since such blocks may have a length of some three feet, the provision of the required holes, which may have a diameter of less than half an inch, involves drilling to a depth of 18 inches even if each hole is drilled partly from one end of the block and partly from the other.

It is found that conventional gun drills, which spring immediately to mind as a probably suitable means of drilling such deep, narrow holes, are in fact not really suitable for this purpose, even though the graphite of the blocks is, of course, a considerably weaker material than the metals on which gun drills are usually employed. One reason for this appears to be that, because the graphite of the blocks is a highly abrasive material, the tip of the gun drill rapidly acquires a slight taper and in consequence, is subjected to a wedging action, as it advances, which tends to make it seize in the hole and, all too frequently, shear from the drill stem on which it is mounted. A further reason, also consequent on wear of the gundrill due to abrasion, appears to arise from the asymmetrical shape of a conventional gun drill. In order to provide for effective swarf removal, in a conventional gun drill, the drill has a longitudinal bore through which air (or other fluid) under pressure is fed to the working tip, and externally the basically cylindrical drill is formed with a longitudinal groove along which the air escapes from the bottom of the hole being drilled, carrying swarf with it. The longitudinal groove is defined by two axially extending plane surfaces which are arranged at an obtuse angle to one another in generally radial planes relative to the drill axis and which at their radially outward edges meet the outer cylindrical surface of the drill in two longitudinally extending corners. That one of these two corners which bounds the one of the two groove-defining surfaces which is advancing as the drill rotates becomes worn, near the tip of the drill, so that the adjacent part of the originally cylindrical outer surface becomes, in effect, a wedging surface such that the drill tends to seize in the hole on being rotated. Thus axial advance of a worn drill and rotation of it are both resisted by tendencies to seize due to respective wedging actions.

It is an object of the invention to provide a drill which enables a hole to be drilled in graphite and similar materials to a depth which is large relative to its diameter and which is less subject than a conventional gun drill to the above-described disadvantages of the latter.

According to the invention, there is provided a drill comprising a tubular drill stem and, secured in and projecting from one end of the stem, a drill tip in the form of a fluted twist drill and comprising a tail part within the stem, a body part which extends from the stem and, at that end of the body part which is remote from the stem, a head part which is of greater diameter than the body part and than the stem, the drill tip having flutes which extend continuously along its head, body and tail parts and through which the stem is open at its said one end.

Preferably, the body part of the drill tip merges with the tail part thereof through a region of reducing diameter and the tubular stem is belled out at its said one end and mates closely with those parts of lands, between the flutes of the drill tip, which are in the said region of reducing diameter.

The said parts of the said lands are preferably brazed to the belled-out end of the stem, within which the tail part of the drill tip is preferably a press fit.

An embodiment of a drill according to the invention is described in greater detail below with reference to the accompanying drawings in which:

FIG. 1 is an elevational view of the drill, and

FIG. 2, on a larger scale, shows a tip of the drill in elevation and part of a stem of the drill in section, and FIGS. 3 and 4 are cross-sectional views, on a still larger scale, taken on the lines III—III and IV—IV, respectively, of FIG. 2.

The illustrated drill comprises a drill tip 11 and a drill stem 12. The tip 11 is in the form of a twist drill with helical flutes 13, and has a main body part 14 with a cylindrical envelope and a head part 15 which has a cylindrical envelope of greater diameter than the body part 14 and of which the free end is ground, in the conventional manner for twist drills, to provide cutting edges 16. At its opposite end, the body part 14 merges, through a region 17 of reducing diameter, with a tial 18 which is of smaller diameter than the body part 14. The flutes 13 are, however, sufficiently deep that they extend along the tail 18 as well as the main body part 14 and the head 15.

The drill stem 12 is tubular and receives the tail 18 of the drill tip, inserted into one end 19, as a tight push fit. The end 19 is belled out, for example by swaging, to mate closely with the reducing diameter region 17 of the drill tip 11. To secure the drill tip 11 in this position the inner surface of the belled-out end 19 of the stem 12 is brazed by brazing 20 to the lands, indicated by reference 21, between the flutes 13 where they cross the reducing-diameter region 17. Between the lands 21, the flutes 13 extend continuously and without obstruction, so as to be in communication with the interior of the stem 12. The stem 12 is thus open, at its end 19, through the flutes 13.

In use of the drill, the end of the stem 12 remote from the tip 11 is engaged in a collet on a rotor shaft and, as the drill is rotated and cimultaneously advanced relative to a work piece, air or another fluid is supplied under pressure to the drill stem and therethrough to the drill tip 11. As the drill drills a hole 22 (represented in FIG. 2 by chain lines) in the workpiece, of graphite or other similar material, it produces swarf (which in the case of graphite is in powder form) which must be removed. The fluid supplied through the stem 12 issues from the end 19 thereof through the flutes 13 and, in the space surrounding the drill body part 14 within the hole 22, entrains the swarf which it then carries with it when escaping from the hole through the annular outer region thereof which surrounds the stem 12. It will be understood that the maximum diameter of the belled-out end 19 of the stem 12 is less than that of the head part 15 of the tip 11, and thus of the hole 22, so as to permit the escape of swarf-carrying fluid. It is probable that, in the space surrounding the drill body part 14 within the hole 22, there is considerable turbulence of the fluid supplied through the stem 12, but that, at least to some extent, the fluid issuing from the stem end 19 through the flutes 13 continues to flow along the flutes (partaking of the rotary movement of the drill as well as following the helical configuration of the flutes themselves) until it reaches the head part 15 of the tip. However that may be, it is found in practice that an efficient entrainment and removal of the swarf is obtained, and that there is little or no tendency for the drill to seize in the hole due to accumulation of swarf.

It will be appreciated that the efficient removal of swarf depends, in part, on the axial length of the head part 15 not being excessive. On the other hand, it is desirable that the head part 15 should not be too short, since (due to the helical form of the flutes 13) reduction of the axial length of the head part 15 also reduces the fraction of 360° round which part-cylindrical lands 23, between the flutes 13, extend round the head part 15; and it is desirable that the circumferential extent of these lands 23 of the head part 15 should be substantial in order to provide adequate guidance of the drill tip.

Dimensions of a very satisfactory practical embodiment of the drill described above may be quoted as follows:

|  | inches |
|---|---|
| Overall length of drill (tip 11 and stem 12) | 27 |
| (to drill a hole length up to | 24 |
| Diameter of envelope of |  |
| head part 15 | 0.307 |
| body part 14 | 0.275 |
| stem 12 (external) | 0.250 |
| (internal) | 0.178 |
| (maximum) of end 19 (external) | 0.275 |
| (internal) | 0.275 |
| End 19 belled to a radius of | 0.600 |
| Length of head part 15 (excluding point) | 0.312—0.250 |
| Length of body part 14 | 0.875 |
| Depth of flutes 13 (relative to internal diameter of stem 12) | 0.030 in. |

In this drill, the stem 12 was of cold-drawn mild steel tube, and the drill tip 11 was of high speed steel with a carbide head part 15 of 96 percent tungsten carbide, 4 percent cobalt.

It will be seen from the foregoing table of dimensions that, in the drill to which they relate, the stem 12 is over twenty times as long as that portion (comprising the head and body parts 15 and 14) of the drill tip 11 which projects from the stem, and that the overall length of the drill is well over 50 times (and is in fact nearly 90 times) as great as the diameter of the head part 15 of the drill tip.

The symmetrical form of the leading end of the drill tip 11 (which is substantially that of a conventional masonry drill), and in particular the symmetrical arrangement of the cutting edges 16, in contrast to the assymmetrical single corresponding cutting edge of a conventional gun drill, means that there is no substantial lateral thrust on the head part 15 during drilling; and this, combined with the symmetrically opposite disposition of the lands 23 and their satisfactory circumferential extent and consequent good centring action, means that there is relatively little wear of leading edges 24 of the lands 23 and relatively little tendency for the lands 23 to become worn to a taper in the axial direction. These considerations are, it is believed, the basis (in conjunction with the above-described efficient removal of swarf) for the observed fact that the drill according to the invention is much less subject to the risk of seizing in the hole being drilled than is a conventional gun drill.

It is found that the use of a drill according to the invention provides very substantial reductions in operating costs as compared with the use of a conventional gun drill. This is partly because drills according to the invention can be made at much lower cost than that at which conventional gun drills are obtainable but also partly because, as a result of its reduced tendency to land wear, the drill according to the invention maintains a mere constant hole size giving increased working life, lower rectification costs and less risk of drill breakage.

We claim:

1. A drill comprising a tubular drill stem and, secured in and projecting from one end of the stem, a drill tip in the form of a fluted twist drill and comprising a tail part within the stem, a body part which extends from the stem and, at that end of the body part which is remote from the stem, a head part which is of greater diameter than the body part and than the stem, the drill tip having flutes which extend continuously along its head, body and tail parts and through which the stem is open at its said one end.

2. A drill as claimed in claim 1, wherein the flutes extend helically.

3. A drill as claimed in claim 1, wherein the body part of the drill tip merges with the tail part thereof through a region of reducing diameter and the tubular stem is belled out at its said one end and mates closely with those parts of lands, between the flutes of the drill tip, which are in the said region of reducing diameter.

4. A drill as claimed in claim 3, wherein the flutes extend helically.

5. A drill as claimed in claim 3, wherein the said parts of the said lands are brazed to the belled-out end of the stem and the tail part of the drill tip is a press fit within the stem.

6. A drill as claimed in claim 1, wherein the drill stem is more than twenty times as long as that portion of the drill tip which projects from it.

7. A drill as claimed in claim 1, wherein the overall length of the drill is more than fifty times as great as the diameter of the head part of the drill tip.

8. A drill as claimed in claim 1, having that end of its stem which is remote from the said one end thereof rotatably mounted and connected to a supply of fluid under pressure.

* * * * *